US007016172B2

(12) United States Patent
Escoda

(10) Patent No.: US 7,016,172 B2
(45) Date of Patent: Mar. 21, 2006

(54) METHOD OF DETECTING AN ARC AND PROTECTING THE LOAD AGAINST SAID ARC

(75) Inventor: Jordi Escoda, Valls (ES)

(73) Assignee: Lear Corporation, Southfield, MI (US)

( * ) Notice: Subject to any disclaimer, the term of this patent is extended or adjusted under 35 U.S.C. 154(b) by 214 days.

(21) Appl. No.: 10/707,556

(22) Filed: Dec. 20, 2003

(65) Prior Publication Data
US 2005/0135025 A1    Jun. 23, 2005

(51) Int. Cl.
*H02H 3/00* (2006.01)
(52) U.S. Cl. ....................................................... 361/42
(58) Field of Classification Search .................... 361/42
See application file for complete search history.

(56) References Cited

U.S. PATENT DOCUMENTS

| 5,280,404 A | * | 1/1994 | Ragsdale ..................... 361/113 |
| 5,729,145 A | * | 3/1998 | Blades ........................ 324/536 |
| 5,933,305 A |   | 8/1999 | Schmalz et al. .............. 361/42 |
| 6,388,849 B1 |  | 5/2002 | Rae ............................. 361/42 |
| 6,577,138 B1 | * | 6/2003 | Zuercher et al. ............ 324/536 |
| 6,798,628 B1 | * | 9/2004 | Macbeth ...................... 361/42 |

* cited by examiner

*Primary Examiner*—Phuong T. Vu
*Assistant Examiner*—Scott Bauer
(74) *Attorney, Agent, or Firm*—Bruce E Harang

(57) ABSTRACT

The invention discloses a method applicable to an electric assembly of an automotive vehicle, comprising a current acquisition step for acquiring the current circulating through at least one load and a step for processing and acting, by means of an electronic system based on one or more microprocessors, which provides the disconnection of the feed from said load and alarm signals, and which also comprises carrying out, by means of said electronic system, with a determined number of instantaneous current values or samples acquired by means of said acquisition step, the calculation of the average value thereof, the update of said average value for each new sample acquired and the calculation of a variable indicating an arc limit through the calculated average current value, the method thus being adapted proportionally to the load variations.

22 Claims, 2 Drawing Sheets

METHOD OF DETECTING AN ARC AND PROTECTING THE LOAD AGAINST SAID ARC

BACKGROUND OF INVENTION

1. Field of the Invention

The present invention relates to a method for detecting an arc and protecting a load against the arc. Particularly the present invention relates to an electrical component in an automotive vehicle, which, through an electronic system, analyzes samples of current circulating through a load and disconnects said load from the feed when an arc is detected.

2. Description of the Related Art

Patent document WO-A-02/39561 teaches an apparatus providing detection and/or protection of an electric system against parallel arcs and series arcs. In this reference, different detection parameters are provided. Different apparatus having different configurations depending on the variable to be monitored and on which the detection of parallel and series arcs will be based. In some cases the voltage in the load, in other cases the intensity circulating through the load, and in yet others the intensity in the load and the voltage in the source will be monitored. On the basis of the values obtained by this monitoring, those values are compared with pre-established thresholds for rated voltage and rated intensity in the load. When these monitored values exceed or fall under said thresholds, depending on if it is voltage or intensity, and are maintained for a certain time in those exceeded or fallen ranges, it will be indicated that a parallel or series arc, has been detected, and the load will be disconnected from the feed and/or series of alarm signals will be activated, such as, for example, LEDs being lit.

The biggest drawback of this apparatus is that the predetermined time, during which it is observed if the monitored values are maintained above or below the pre-established thresholds, is very high, a minimum of 10 ms. but preferably 20 ms., being taught. During this time period there is no protective action against an arc being carried out, which is very dangerous for the load, because before the load is disconnected from the feed, it could have be seriously damaged for having maintained the arc too long. Another drawback of the apparatus is that the instantaneous value of the intensity or voltage in the load is compared continuously, which can make certain transient phenomena falsely effect the result of said comparison.

U.S. Pat. No. 5,933,305 issued Aug. 3, 1999 to Schmalz et al teaches the possibility of carrying out arc detection by the analysis of values acquired by a monitoring component, during a certain interval, comparing the result of said analysis with other previous ones and expressing the result of said comparison in the form of bits (1 when an increase occurs with regard to a previous interval, and 0 when this comparison provides a negative result). Said bits are stored in a shift register and are therefore updated every certain number of bits, depending on the capacity of the register, and if they are representative of a sufficient number of changes indicate that an arc has occurred (this number is marked by a counter), it acts accordingly, disconnecting the load from the feed. As this method does not take into account the amplitude of the samples, it can be used to detect parallel arcs as well as series arcs. The fact that the amplitude is not taken into account is also a drawback, since the types of arc are not differentiated, nor is the detection of a possible short circuit taken into account which would make the immediate disconnection of the load from the feed essential, without waiting for a larger number of samples to be analyzed. This slowness in the response to an arc on the load could cause potentially irreversible damage to the electric system.

U.S. Pat. No. 6,388,849 issued May 14, 2002 to Rae teaches an arc detector and a circuit responsible for disconnecting the feed from the load in the case of an arc. The teaching is directed to the case in which the arcs occur in an alternating current (AC) electric system. The method used by said detector to generate an arc signal and therefore make said disconnecting circuit act is based on carrying out a moving average, taking the period of the frequency of said alternating current as a reference, with acquired instantaneous current values and if the value obtained exceeds a preset threshold, an arc signal is generated. To prevent false detections due to other transient phenomena which also modify the average current value, another method is disclosed which also includes a pulse generator that will ignore said transient phenomena and will generate pulses every time it detects a step increase in current. Said generator can even act as a function of a predetermined value of pulses generated every time an arc occurs. In the case where said pulse generator is included, the arc indicating signal will be determined by the average current value obtained exceeding the preset threshold and whether the pulse generator generates a pulse, i.e. both situations must occur for an arc signal to be generated and for the detector circuit to act accordingly. Said document does not mention the possibility of being applied in a direct current (DC) electric system. It is also clear from the document that, as in the previously mentioned references, the action against a possible arc is not very fast, since the analyses are carried out in half-periods or periods of the frequency of the alternating current. Nor does it indicate if the proposed detector serves to detect series and parallel arcs, and if it is capable of differentiating them, since it only refers to acting in case the average current value excessively exceeds a preset threshold. This reference also values from which the threshold is compared with the calculated average current value, indicating that the latter has one or several set values.

It is therefore still desirable to provide greater reliability when detecting series and parallel arcs, as well as short circuits and, especially, a faster detection, which will be reflected in an almost immediate action on the load if one of said phenomena occurs by disconnecting the load from the feed.

DESCRIPTION OF THE INVENTION

The present invention relates to a method for detecting an arc and protecting the load against the arc, applicable to an electric component of an automotive vehicle, comprising a current acquisition step for acquiring current circulating through at least one load and a step for processing and acting, by disconnecting the feed from said load and triggering alarm signals which are internal and/or external to said system. Said method comprises calculating an average value of a desired number of current value samples, or the instantaneous current value, then updating the average current value with acquisition of each new sample and the calculation of a variable indicating an arc limit from the calculated current value.

Another aspect of the present invention relates to a method for detecting an arc and protecting a load against said arc, applicable to an electric assembly of an automotive vehicle, utilizing an electronic microprocessor based system comprising: acquiring at least two samples of the amount of current circulating through each of at least one load, calculating the average value of said acquired samples and updating said average value with the acquisition of each new sample, calculating a variable indicating an arc limit through the calculated average current value, and disconnecting the fee from the sampled load and activating at least one alarm signal.

This calculation of the average value, which could be called moving average, and its proportional influence on said variable indicating an arc limit, is much more characteristic of the behavior of the load, in this case of the intensity circulating through it, unlike the references, where only the instantaneous current values or, in the case of the average value thereof, the comparison was carried out with a fixed arc threshold or limit value.

DETAILED DESCRIPTION

Figure 2:
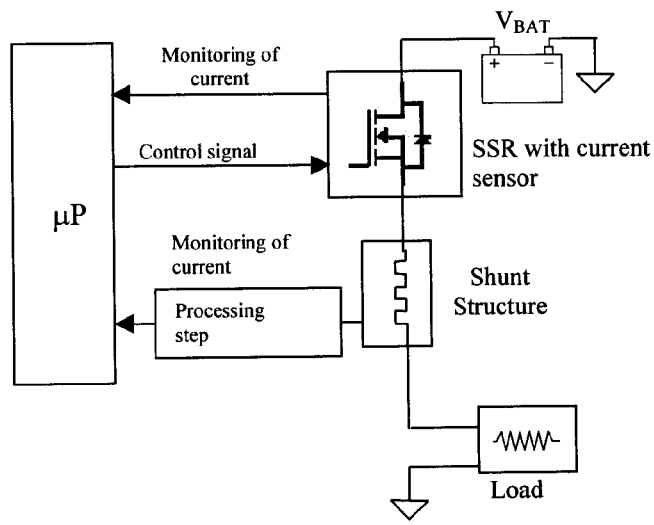
FIG. 2 shows a practical embodiment of applying the method of the present invention.

There is shown in the figures, a preferred method for detecting an arc and protecting the load against the arc, applicable to an electric assembly of an automotive vehicle comprising, as can be seen in FIG. 2, a current acquisition step for acquiring current circulating through at least one load, or load channel, and a step for processing and acting, by means of an electronic system based on one or more microprocessors, which provides the disconnection of the feed from said load and the activation of at least one alarm signal.

The current acquisition is carried out independently for each one of the loads or load channels connected to an electric assembly, by the inclusion of one or more current sensors positioned ahead of said loads, said current sensor preferably being integrated into a Solid State Relay. This Solid State Relay will also be responsible for deactivating the load in the case where an arc or short circuit is detected. The present invention can be configured to detect a parallel or a series arc as well as a short circuit. Other types of current sensors as well as other arrangement configurations thereof would be possible, such as current sensors forming part of a shunt structure or Hall Effect sensor, or any other sensor with a suitable measurement range and response time.

The method consists of carrying out through the acquisition of a series of instantaneous current or intensity values, the calculation of the average value thereof, the update of said average value for each new sample acquired, by which a moving average of the intensity circulating through the load and the calculation of a variable indicating an arc limit can be obtained through the calculated average current value. With this average value and the instantaneous values corresponding to the successive acquisitions, and comparing them to a series of parameters previously set by the user, or variables proportional to said moving average, and through a series of steps shown in FIG. 1, the method of the present invention is implemented.

In the method of the present invention the following parameters are used: $I_{inst}$=Instantaneous intensity $I_{average}$=Average intensity $I_{min}$=Minimum intensity limit $I_{max}$=Maximum intensity limit $I_{arc}$=Arc intensity or arc limitMore particularly the steps of the method of the present invention comprise: a) current acquisition, with which an instantaneous value ($I_{inst}$) of the current circulating through the load is obtained, b) calculation of the average value ($I_{average}$) from the acquisitions made in a), in a sufficient number, such as, for example, eight samples as shown in the present example and, as previously explained, the average value ($I_{average}$) is updated for each new sample, disregarding the oldest sample and exchanging it for the most recent sample, c) calculation of the value of the variable indicating an arc limit ($I_{arc}$), updated for each sample, by means of the product of a variable representative of an arc detection threshold which has previously been assigned a value, preferably between 0.75 and 0.9, in a preferred embodiment being approximately equal to 0.875, and the average current value, d) comparison of the average current value with a preset current value indicating a maximum limit ($I_{max}$), disconnecting said load channel from the feed due to the presence of a short circuit and/or parallel arc, if the average current value is higher than said maximum limit and returning to step a) after reporting to the system or, if the average current value is lower than the maximum limit, it will proceed to the next step,e) comparison between the instantaneous current value acquired and a preset current value indicating a minimum limit ($I_{min}$), deactivating a possible internal arc pre-detection signal if it were activated, and not carrying out any action on the load if said comparison provides the result that the instantaneous current value acquired is lower than the minimum limit (condition 3 of FIG. 3). In this case, it returns to step a) after reporting to the system. If, on the other hand, the instantaneous current value acquired is higher than said minimum limit, it will proceed to the next step, f) verification of the existence of an arc pre-detection signal (which would exist if a possible arc condition had been detected in a previous cycle). If the latter does not exist and the instantaneous current value is lower than that of said arc limit, said signal will be activated, a value larger than 0 (equal to or greater than two in the present example) will be assigned to a counter variable (COUNT. in FIG. 1) accessible to the system, and it will return to step a) after reporting to the system. If the arc pre-detection signal does not exist but the instantaneous current value is higher than that of the arc limit, the cycle will conclude as it is interpreted as not being in any of the arc zones and, after reporting to the system, will directly return to step a). If said arc pre-detection signal exists, it will proceed to the next step, g) comparison between the instantaneous current value acquired and the arc limit value, disconnecting the load channel from the feed and activating an internal series arc detection signal if said comparison results in the instantaneous current value being lower than the arc limit, since this proves that the instantaneous current value has been kept within the series arc zone (condition 2 of FIG. 3), and, after reporting to the system, proceeds to step a). If said comparison provides the opposite result, i.e. the arc limit is lower than the instantaneous current value, it is determined that after a possible arc detection, the current sample of the current is not within the series arc zone (condition 1 of FIG. 3), a positive arc detection will not be determined and, therefore, the method proceeds to the next step, h) verification of the value of the counter variable: if it is equal to zero, it is determined that after a possible arc condition (arc pre-detection) none of the consecutive n current acquisitions (where n is the value with which the COUNT. variable is activated) returns to the series arc zone, therefore the internal arc pre-detection signal will be deactivated without carrying out any action whatsoever on the load, and it will return to step a) after reporting to the system. If, however, said variable is not equal to zero, one unit will be subtracted from the counter variable without deactivating the arc pre-detection signal and also, after reporting to the system, another cycle will be initiated with a new current acquisition, i.e. it will return to step a).

The majority of the previous steps concluded by reporting to the system before returning to step a), i.e. before initiating another cycle by means of a new current acquisition. It is obvious that said new current acquisition will result in zero if the result of the step prior to the new cycle had been that of disconnecting the load and the load had not been reconnected. How and when said load is reconnected is not object of this patent. This is why, in the previous steps, it is simply stated that it reported to the system, since it is the system which is responsible for reconnecting the load/s again when considered necessary, depending on the priority that the load has for the system and on the time it can or the time it is advisable for it to remain disconnected. This is why reconnecting the load/s is not indicated as another step in the flow chart shown in FIG. 1, since this reconnection is not carried out by the method of the present invention but rather by the monitored system itself, independent of the method of the present invention.

Figure 1:
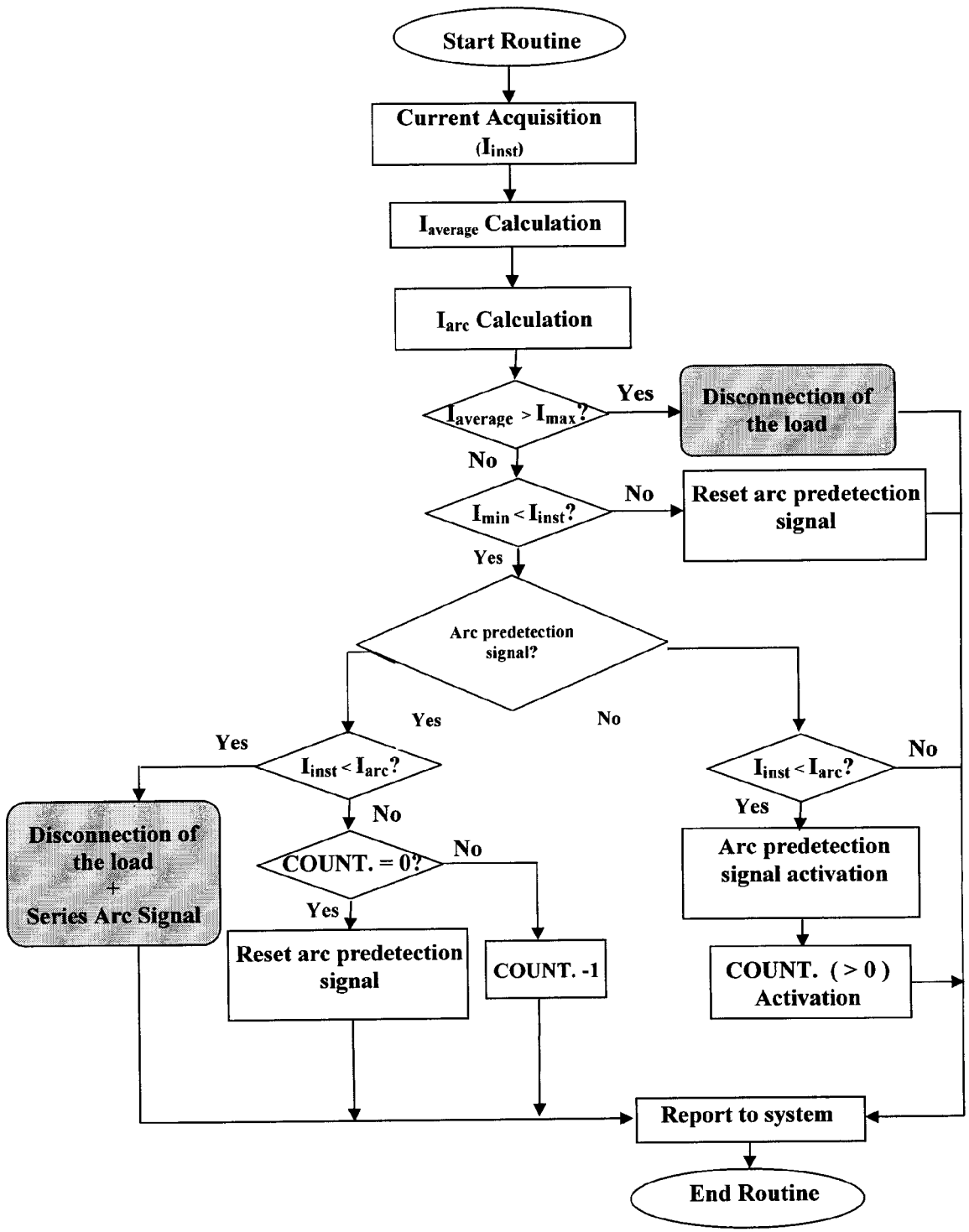
FIG. 1 shows a flow chart illustrating the different steps to be carried out by the method of the present invention.

In the present example shown in FIG. 1, the maximum current limit has a value approximately equal to double the rated current circulating through each load channel, and the minimum limit has a value approximately equal to 10% of the rated current.

It is also to be understood that in the present example, the average current value is updated for each new sample acquired taking into account eight or more immediately preceding acquisitions, and that the value will continue to be updated even though the current value is practically zero.

In an embodiment where the current of the load had a behavior similar or equal to the one controlled by Pulse Width Modulation (PWM), the average current value would not be updated as long as the current acquisitions remained below the minimum current limit.

FIG. 2 shows an example of an electronic assembly suitable for use with the method of the present invention. In this figure it can be seen how the Solid State Relay (SSR) has a current sensor incorporated on the inside thereof, which is connected to a shunt structure, that in turn is connected to a load. As can be seen, the Solid State Relay controls the passage of a voltage $V_{BAT}$ coming from the battery of the vehicle to the load/s. Monitoring of the current is carried out in this case by comparing the signals coming from the sensor inside the Solid State Relay and/or shunt structure, after a prior processing step which adapts the signals coming from it, a microprocessor being responsible for analyzing said signals and acting accordingly, applying the method of the present invention and sending the corresponding control signals to the relay to disconnect the feed from the load when necessary. It is to be understood that this is just one implementation of the present invention and any electronic system in which the method of the present invention could be applied is contemplated herein.

Figure 3:
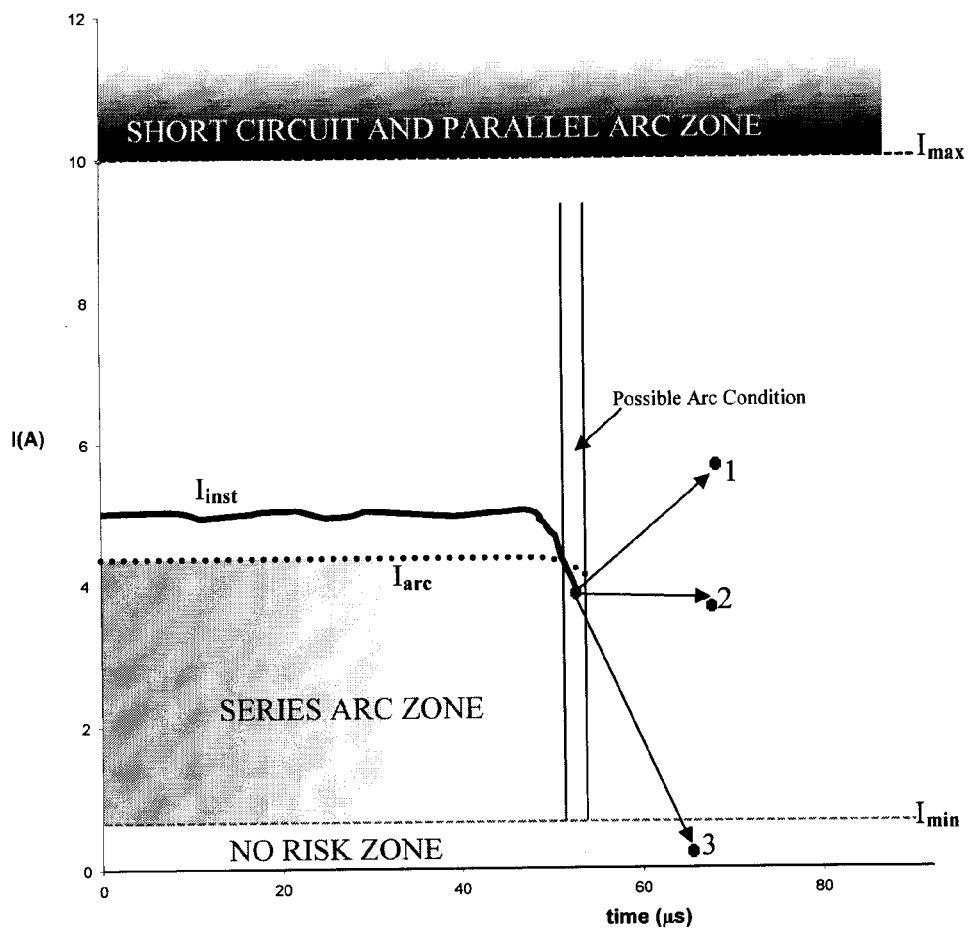
FIG. 3 shows a graphic representation of the different conditions through which the intensity circulating through the load can go through once a possible arc is detected, according to the method of the present invention.

Turning now to FIG. 3 there is shown the different conditions in which the intensity in the load could be found after a possible arc condition, in the method of the present invention. FIG. 3 shows the different parameters previously defined and taken into account by the method with values randomly selected for the present example. It can be seen how $I_{arc}$ evolves slowly in a decreasing manner and proportional to $I_{average}$ when the instantaneous intensity decreases.

In the band marked "possible arc condition", the behavior of the intensity can be noticed when a series arc occurs, specifically when said intensity decreases, due to the impedance a series arc adds to the load, but it remains stabilized at a certain level. This condition is indicated in the graph by the arrow 2. The arrow 1 indicates a second path for the intensity to follow after said decrease for which the intensity is not stabilized, i.e. the series arc condition is not confirmed. This consists of the recovery of the intensity, i.e. it increases, which would either be indicative that the possible arc was not an arc but rather a transient phenomenon, in which case the intensity returns to its rating, or, if the intensity continues to increase, that another anomalous phenomenon has occurred, such as a short circuit if the intensity finally exceeds that established as the maximum limit $I_{max}$, or a parallel arc, whose effects, in fact, are very similar to those of a short circuit. Lastly, arrow 3 indicates a third path for the intensity to follow after detecting the supposed "arc condition", and which is none other than the intensity continuing to decrease until it is below the minimum limit, which would be indicative that the circuit has opened, i.e. the feed has been disconnected from the load, or that the load simply has a certain standstill consumption. All these conditions are addressed by the present method (see FIG. 1).

A person skilled in the art could introduce changes and amendments to the disclosed embodiment example without exceeding the scope of the invention as defined in the attached claims.

What is claimed is:

1. A method for detecting an arc and protecting a load against said arc, applicable to an electric assembly of an automotive vehicle, utilizing an electronic microprocessor based system comprising:

acquiring at least two samples of the amount of current circulating through each of at least one load, calculating the average value of said acquired samples and updating said average value with the acquisition of each new sample, calculating a variable indicating an arc limit through the calculated average current value; and disconnecting the feed from the sampled load and activating at least one alarm signal.

2. A method according to claim 1, wherein the current acquisition is carried out independently for each of said at least one load connected to said electric assembly at a position in said electric assembly prior to said at least one load.

3. A method according to claim 2, wherein said electronic system has a register of rated currents to be circulated through each of at least one of said loads determining preset current values indicating a maximum limit, a minimum limit, and an arc detection threshold for each of said at least one load.

4. A method according to claim 3, wherein said arc detection threshold and said average current value is updated with the acquisition of each additional current sample.

5. A method according to claim 4, wherein a value obtained through said calculation of said average current value for a load exceeds said maximum current limit, said load is disconnected from the feed due to the presence of one of a short circuit and a parallel arc.

6. A method according to claim 4, wherein a value obtained through said calculation of the average current value for a load channel is lower than said maximum current limit, a comparison between the instantaneous current value acquired and said minimum limit is carried out.

7. A method for detecting an arc and protecting a load against said arc, applicable to an electric assembly of an automotive vehicle, utilizing an electronic microprocessor based system comprising:

acquiring at least two samples of the amount of current circulating through each of at least one load, calculating the average value of said acquired samples and updating said average value with the acquisition of each new sample, calculating a variable indicating an arc limit through the calculated average current value; and disconnecting the feed from the sampled load and activating at least one alarm signal;

wherein said current acquisition is carried out independently for each of said at least one load connected to said electric assembly at a position in said electric assembly prior to said at least one load; said electronic system having a register of rated currents to be circulated through each of at least one of said loads determining preset current values indicating a maximum limit, a minimum limit, and an arc detection threshold for each of said at least one load;

wherein said arc detection threshold and said average current value is updated with the acquisition of each additional current sample;

wherein a value obtained through said calculation of said average current value for a load channel is lower than said maximum current limit a comparison between the instantaneous current value acquired and said minimum limit is carried out; and wherein said comparison provides a result of the instantaneous current value acquired being greater than said minimum limit and, is also lower than said arc limit value, an internal arc pre-detection signal is activated and a value greater than zero will be sent to a counter variable accessible to said electronic microprocessor based system.

8. A method according to claim 7, where the value of the next instantaneous current acquisition results in the average current value acquired being lower than the maximum current limit, said instantaneous current value being greater than the minimum limit, and lower than said arc limit, said load is disconnected from the feed and an internal series arc detection signal is generated.

9. A method according to claim 7, where the value of the next instantaneous current acquisition results in the average current value acquired being lower than the maximum current limit and lower than that of the minimum limit, the said internal arc pre-detection signal is deactivated and no action whatsoever is taken on the load.

10. A method according to claim 7, where the value of the next instantaneous current value acquisition results in the average current value acquired being lower than the maximum current limit, being greater than the minimum limit, greater than said arc limit, and said counter variable is not equal to zero, a unit is subtracted from said counter variable.

11. A method according to claim 7, where the value of the next instantaneous current value acquisition results in the average current value acquired being lower than the maximum current limit, being greater than the minimum limit, greater than said arc limit, and said counter variable is equal to zero, the said internal arc pre-detection signal is deactivated without carrying out any action on the load.

12. A method according to claim 3, wherein said maximum limit has a value substantially equal to about double said rated current and said minimum limit has a value substantially equal to about 10% of the rated current.

13. A method according to claim 3, wherein said maximum limit has a value greater than double said rated current and said minimum limit has a value of lower than 10% of said rated current.

14. A method according to claim 3, wherein said arc detection threshold has a value between about 0.75 and about 0.9.

15. A method according to claim 14, wherein said arc detection threshold is substantially equal to about 0.875.

16. A method according to claim 2, wherein a sensor for acquiring said current values is integrated into a Solid State Relay responsible for deactivating the load where the arc or short circuit detection is positive.

17. A method according to claim 2, wherein a sensor for acquiring said current values forms part of a shunt structure.

18. A method according to claim 2, wherein a sensor for acquiring said current values is a Hall Effect sensor.

19. A method according to claim 7, wherein said counter variable has a value equal to or greater than two.

20. A method according to claim 1, wherein said average value is updated for each new current acquisition, taking into account eight or more immediately preceding current acquisitions.

21. A method according to claim 9, wherein said average value will continue to be updated even though the current value is practically zero.

22. A method according to claim 9, where when the current of the load has a behavior similar or equal to the one controlled by PWM, said average value will not be updated as long as the current acquisitions remain below said minimum limit.

* * * * *